(12) United States Patent
Crippa et al.

(10) Patent No.: US 11,149,809 B2
(45) Date of Patent: Oct. 19, 2021

(54) CALIPER BODY FOR DISC BRAKE, BRAKE CALIPER AND DISC BRAKE

(71) Applicant: FRENI BREMBO S.P.A., Bergamo (IT)

(72) Inventors: Cristian Crippa, Curno (IT); Davide D'Alessio, Curno (IT)

(73) Assignee: Freni Brembo S.p.A., Bergamo (IT)

(*) Notice: Subject to any disclaimer, the term of this patent is extended or adjusted under 35 U.S.C. 154(b) by 26 days.

(21) Appl. No.: 16/472,565

(22) PCT Filed: Dec. 14, 2017

(86) PCT No.: PCT/IB2017/057940
§ 371 (c)(1),
(2) Date: Jun. 21, 2019

(87) PCT Pub. No.: WO2018/127751
PCT Pub. Date: Jul. 12, 2018

(65) Prior Publication Data
US 2019/0323569 A1    Oct. 24, 2019

(30) Foreign Application Priority Data
Dec. 22, 2016   (IT) .................. 102016000130165

(51) Int. Cl.
*F16D 65/00*     (2006.01)
*F16D 55/228*    (2006.01)
(Continued)

(52) U.S. Cl.
CPC ....... *F16D 65/0068* (2013.01); *F16D 55/228* (2013.01); *F16D 65/847* (2013.01);
(Continued)

(58) Field of Classification Search
CPC .. F16D 65/0068; F16D 65/847; F16D 55/228; F16D 2055/0016; F16D 2055/0091
See application file for complete search history.

(56) References Cited

U.S. PATENT DOCUMENTS

2008/0277216 A1    11/2008   Cornolti et al.
2011/0048870 A1*   3/2011    Petrini ................ F16D 65/847
                                                        188/71.6
(Continued)

FOREIGN PATENT DOCUMENTS

| EP | 1016804 A1 | 7/2000 |
| EP | 2284415 A1 | 2/2011 |
| WO | 2010051135 A1 | 5/2010 |

OTHER PUBLICATIONS

European Patent Office, International Search Report and Written Opinion in Application No. PCT/IB2017/057940, dated May 2, 2018, 12 pages, Rijswijk, Netherlands.

*Primary Examiner* — Melody M Burch
(74) *Attorney, Agent, or Firm* — Marshall & Melhorn, LLC

(57) ABSTRACT

A caliper body for a disc brake having at least one thrust housing. The housing has a housing bottom wall and a housing lead-in edge portion. The housing lead-in edge portion has at least one housing edge surface. At least either a first elongated element caliper inner side or a second elongated element caliper inner side has at least one groove bottom wall and groove sides which delimit at least one groove. The at least one groove bottom wall is axially outer with respect to the housing edge surface.

10 Claims, 13 Drawing Sheets

(51) Int. Cl.
    *F16D 65/847*     (2006.01)
    *F16D 55/00*     (2006.01)

(52) U.S. Cl.
    CPC ................ *F16D 2055/0016* (2013.01); *F16D 2055/0091* (2013.01)

(56) References Cited

U.S. PATENT DOCUMENTS

| | | | |
|---|---|---|---|
| 2015/0027822 A1 | 1/2015 | Cerutti et al. | |
| 2016/0327107 A1* | 11/2016 | Magni | F16D 55/22 |
| 2016/0369858 A1* | 12/2016 | Jackson | F16D 65/183 |
| 2018/0216681 A1* | 8/2018 | Hampson | F16D 65/0068 |

* cited by examiner

CALIPER BODY FOR DISC BRAKE, BRAKE CALIPER AND DISC BRAKE

FIELD OF THE INVENTION

The present invention relates to a caliper body for a brake caliper for a disc brake, as well as a brake caliper comprising such caliper body and a disc brake comprising such brake caliper.

PRIOR ART

In a disc brake, the brake caliper is generally arranged straddling the outer peripheral margin of a brake disc, adapted to rotate about a rotational axis defining an axial direction (X-X). In a disc brake, a radial direction (R-R), arranged substantially orthogonal to the axial direction (X-X), and a tangential or circumferential direction (C-C), orthogonal to both the axial direction (X-X) and the radial direction (R-R), is further defined.

The brake caliper usually comprises a caliper body having two elongated portions arranged so as to face opposite braking surfaces of a brake disc, and at least one bridge, which connects the two elongated portions to each other and which protrudes straddling from the disc. In a typical arrangement of a disc brake on a vehicle, a braking surface of the brake disc faces towards the outside of the vehicle, defining the vehicle outer side of the disc brake, or side facing the vehicle wheel, and the opposite braking surface of the brake disc faces the vehicle itself, defining the vehicle facing side of the disc brake. So, when the brake caliper is mounted on a brake disc, a first elongated portion of the caliper body is on the outer side of the vehicle, or wheel side, and a second elongated portion of the caliper body is on side facing the vehicle, or vehicle side. Clutch pads are provided arranged between each elongated portion of the caliper body and the facing braking surfaces of the brake disc.

In fixed caliper bodies associated with fixed discs, both elongated portions of the caliper body have a cylinder, or plurality of cylinders, connected to a brake fluid feeding channel and adapted to accommodate hydraulic pistons capable of applying a thrust action on the clutch pads facing it or themselves, making them abut against the braking surfaces of the disc to apply the braking action on the vehicle.

This braking action on the brake disc applies a considerable friction adapted to create the described braking torque, friction which generates heat, determining an increase of the temperature of the brake disc, of the pads and of the caliper body, while the braking action mechanically biases the caliper body itself, whereby deforming it. So, the concurrent increase of the temperature of caliper body and its deformation constitute a risk that the mechanical strength performance of caliper body may deteriorate when very superheated.

Even more relevant is the fact that the temperature increase of the pad and of the caliper body may influence the area in which the thrust devices, cylinder-piston assemblies, are provided, whereby influencing the brake fluid features in the feeding pipes and in the cylinder chambers. In extreme cases, the brake fluid itself may boil, whereby forming a gaseous state in the feeding pipes or in the chamber formed between cylinder and piston which is dangerously compressible and no longer suited to transfer the braking command adequately and promptly to the pistons, and thus to the pads. This very dangerous phenomenon is solved in part by using brake fluid having high boiling temperatures, and caliper bodies provided with ventilation openings adapted to evacuate the heat.

The need is thus strongly felt to cool a caliper body when it is in working conditions.

At the same time, the need is felt to separate the heat source and the caliper body by means of a heat barrier.

An example of solution aimed at increasing the heat exchange between the caliper body and the air surrounding the caliper, in order to reduce the heat accumulated by the caliper body itself, is known from document WO-2010-051135.

In the case of high-performance braking systems, the caliper body is associated with a forced cooling air feeding device which conveys air to near the pads. Examples of such solutions are for example known from documents EP-1016804, EP-2284415 and US-2008-277216 by the Applicant.

However, these known solutions are extremely complicated to make, mount and maintain, above all on vehicles of everyday use, as well as on high or very high-performance vehicles. Furthermore, the need is strongly felt to effectively evacuate heat if the caliper body accumulates heat despite the cooling obtained by the air feeding and circulation. Indeed, if heat is regrettably accumulated in the caliper body mass, it takes a very long time to cool down, in the known caliper forms, whereby exposing the braking system to accumulate even more heat in case of repeated braking actions of considerably entity, to an increased risk of boiling of the braking fluid and to a deterioration of the strength performance of the material of which the brake caliper is made.

The need is thus strongly felt to provide a caliper body capable of adequate heat exchange performance between the caliper body and the air surrounding the caliper, in order to reduce the heat accumulated by the caliper body itself, without because of this decreasing the resistance to deformation of the caliper body or increasing the weight and dimensions of the caliper body.

At the same time, the need is strongly felt to provide a caliper body which, despite being simple to make, assemble and maintain, is sufficiently rigid to oppose to the deformations deriving from the braking actions and at the same is adapted to provide a reduced heat accumulation and is lighter than known solutions.

SOLUTION

It is an object of the present invention to solve the drawbacks of the prior art and to provide a solution to the needs described hereto with reference to the prior art.

These and other objects are achieved by a caliper body, a brake caliper and a disc brake according to the claims.

Some advantageous embodiments are the object of the dependent claims.

FIGURES

Further features and advantages of the caliper body, of the brake caliper and of the disc brake will be apparent from the description provided below of preferred embodiments thereof, given for illustrative but not limiting purposes, with reference to the accompanying drawings, in which.

DESCRIPTION OF SOME PREFERRED EMBODIMENTS

Figure 1:
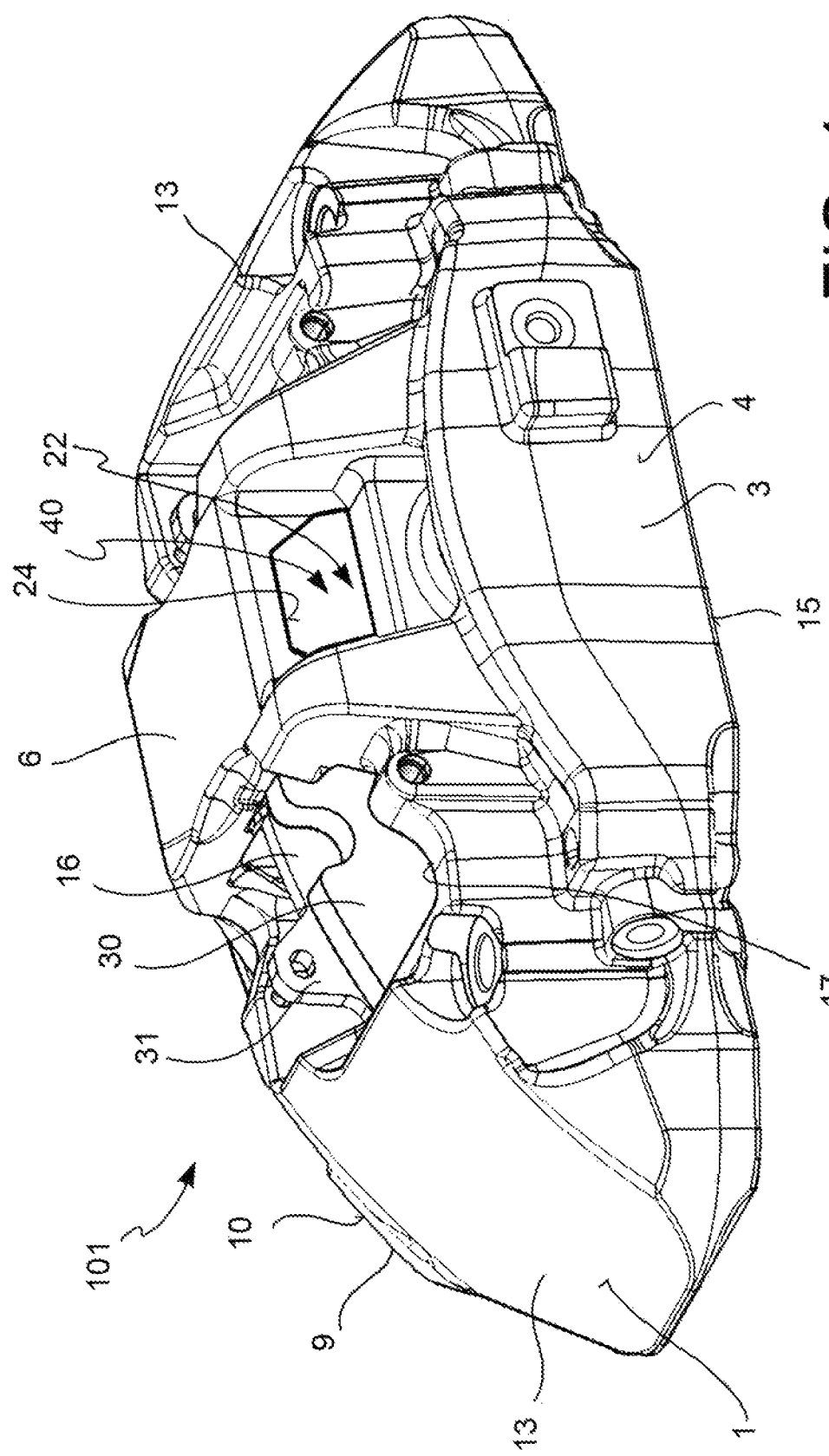
FIG. 1 shows a radially outer axonometric view of a brake caliper, according to an embodiment.
Figure 2:
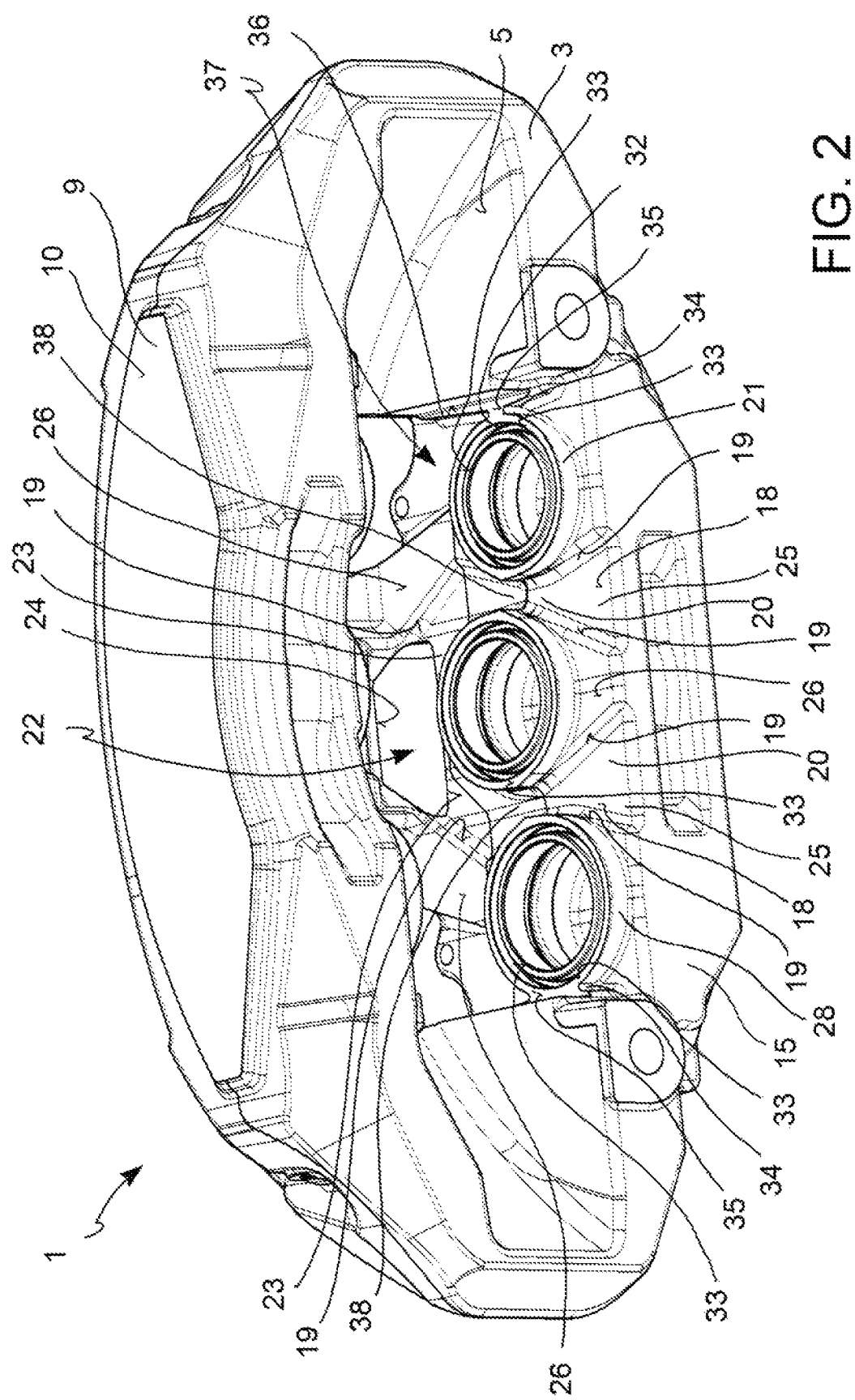
FIG. 2 shows a radially inner axonometric view of a brake caliper, according to an embodiment.
Figure 3:
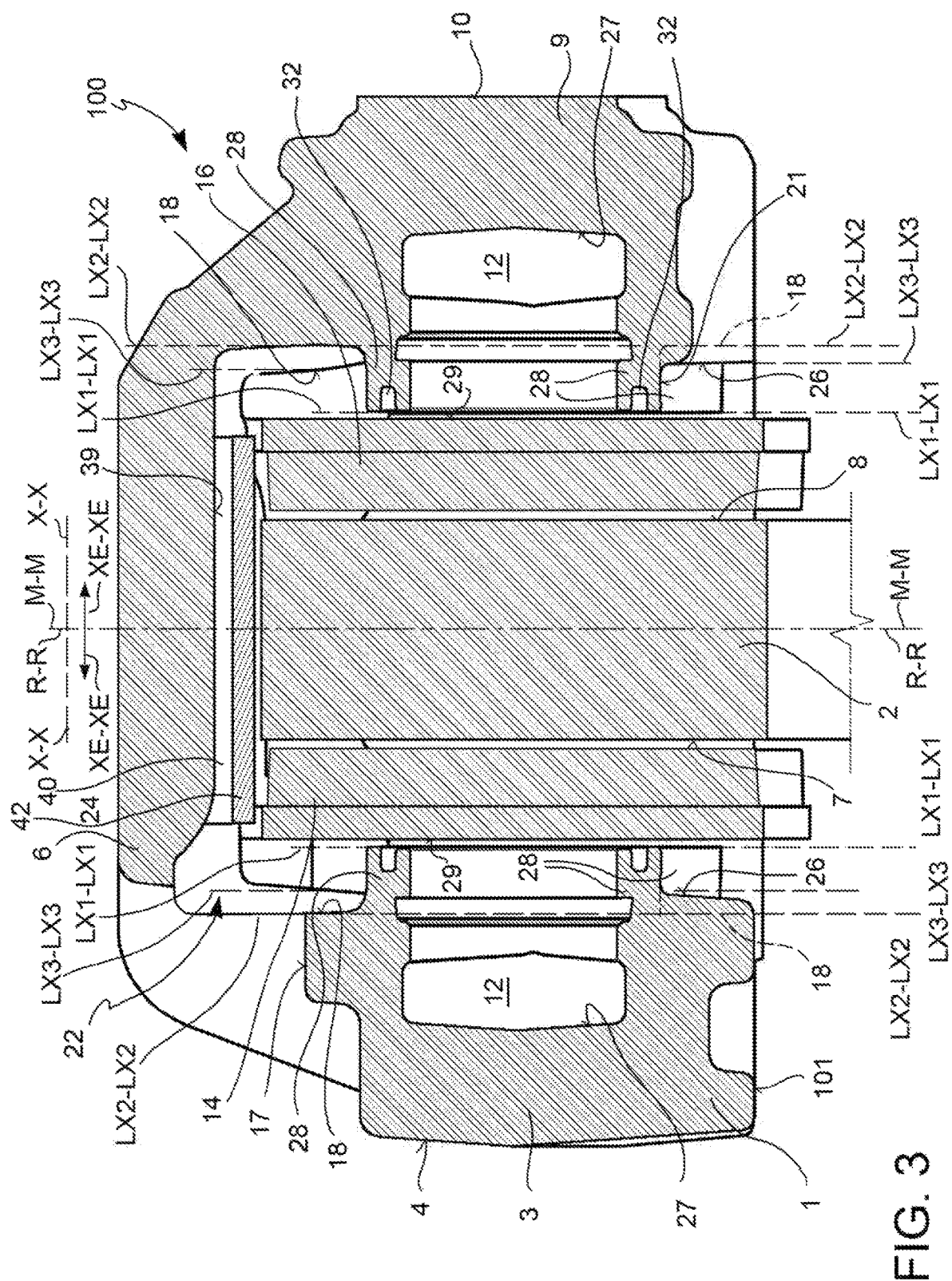
FIG. 3 is a section taken along an axial and radial cutting line which illustrates a disc brake, according to an embodiment.
Figure 4:
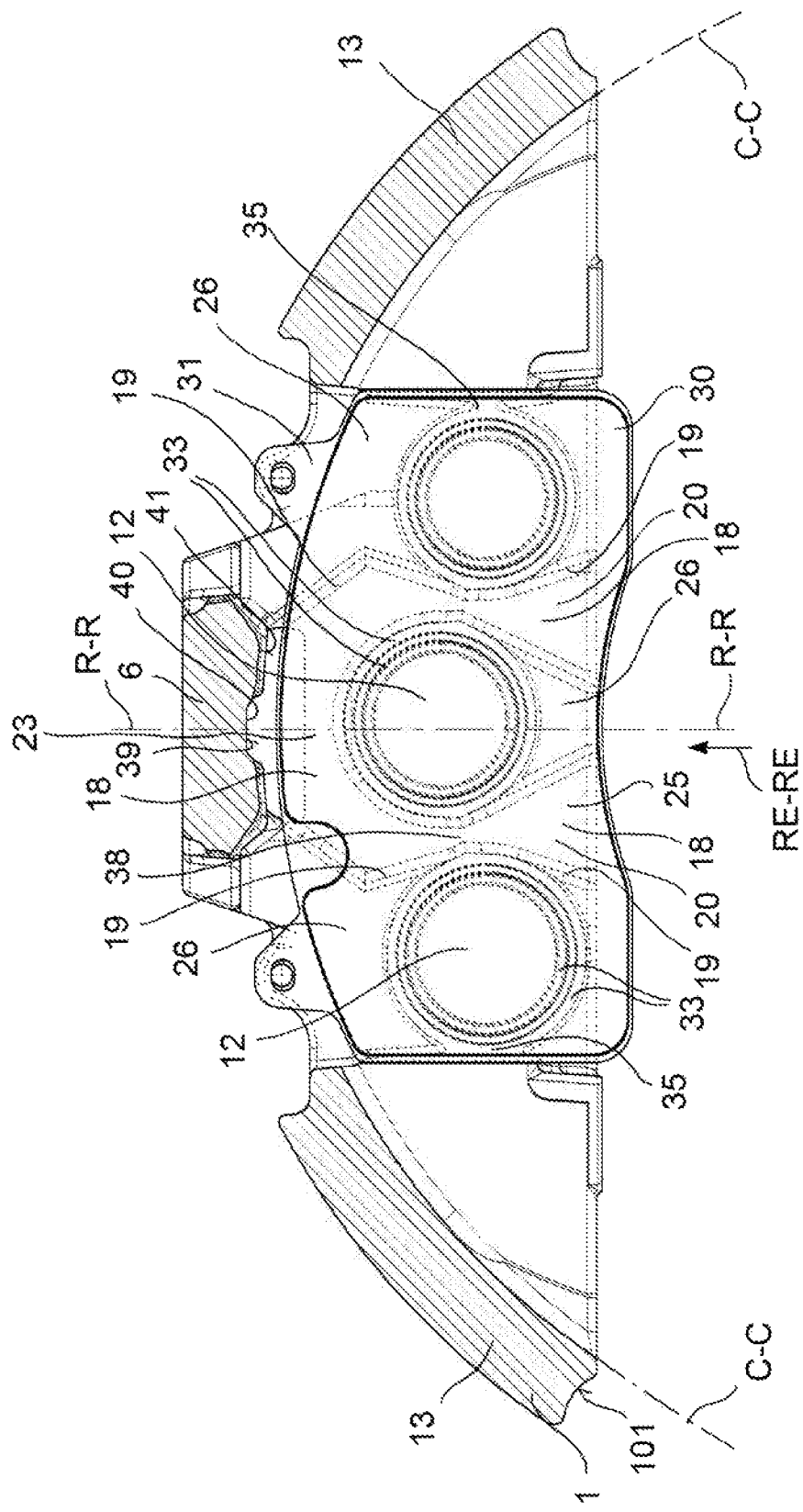
FIG. 4 is a section taken along a radial and circumferential cutting plane which illustrates a portion of a brake caliper with parts partially transparent for the sake of clarity.
Figure 5:
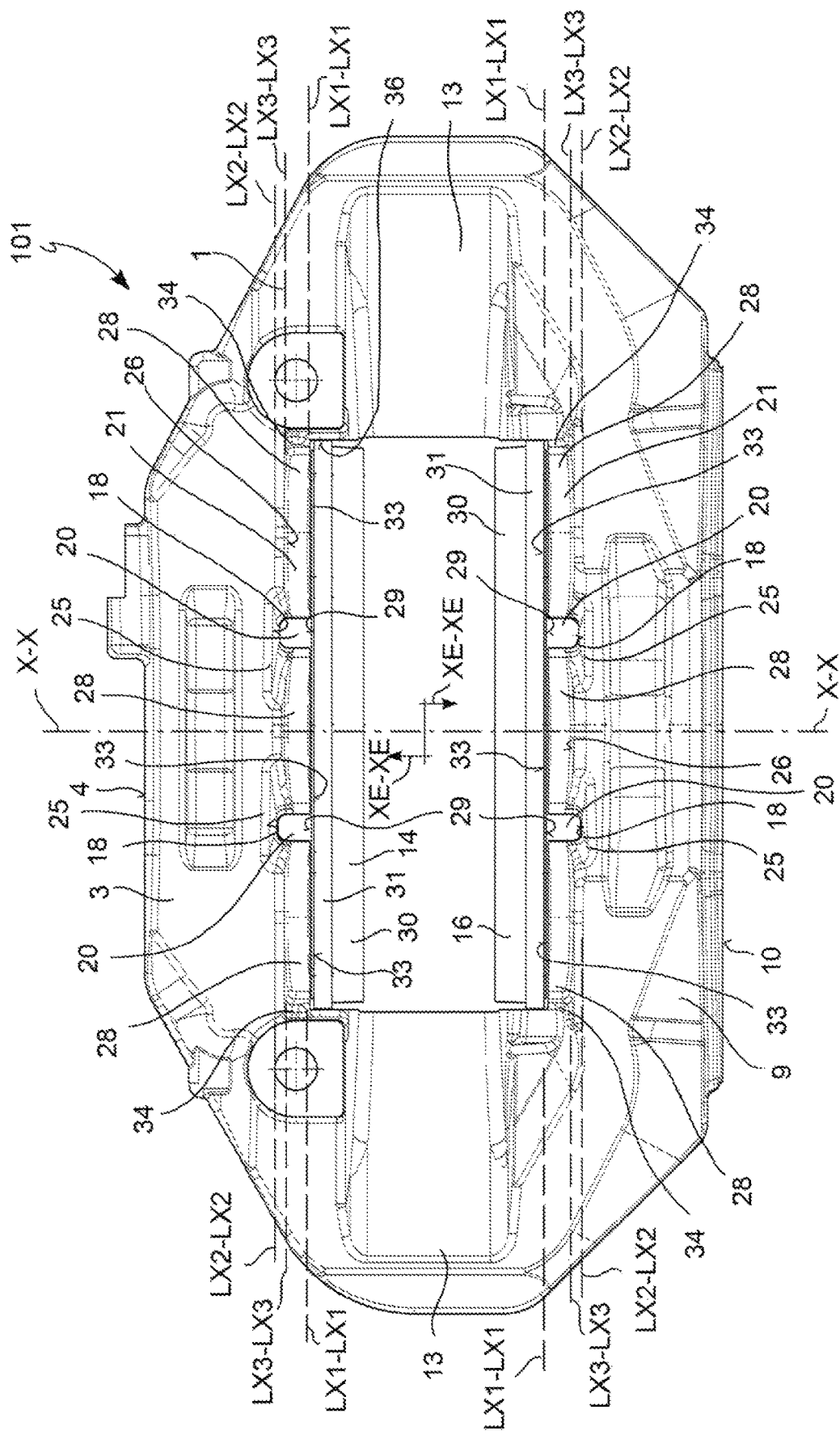
FIG. 5 shows a radially inner plane view of a brake caliper, according to an embodiment.
Figure 6:
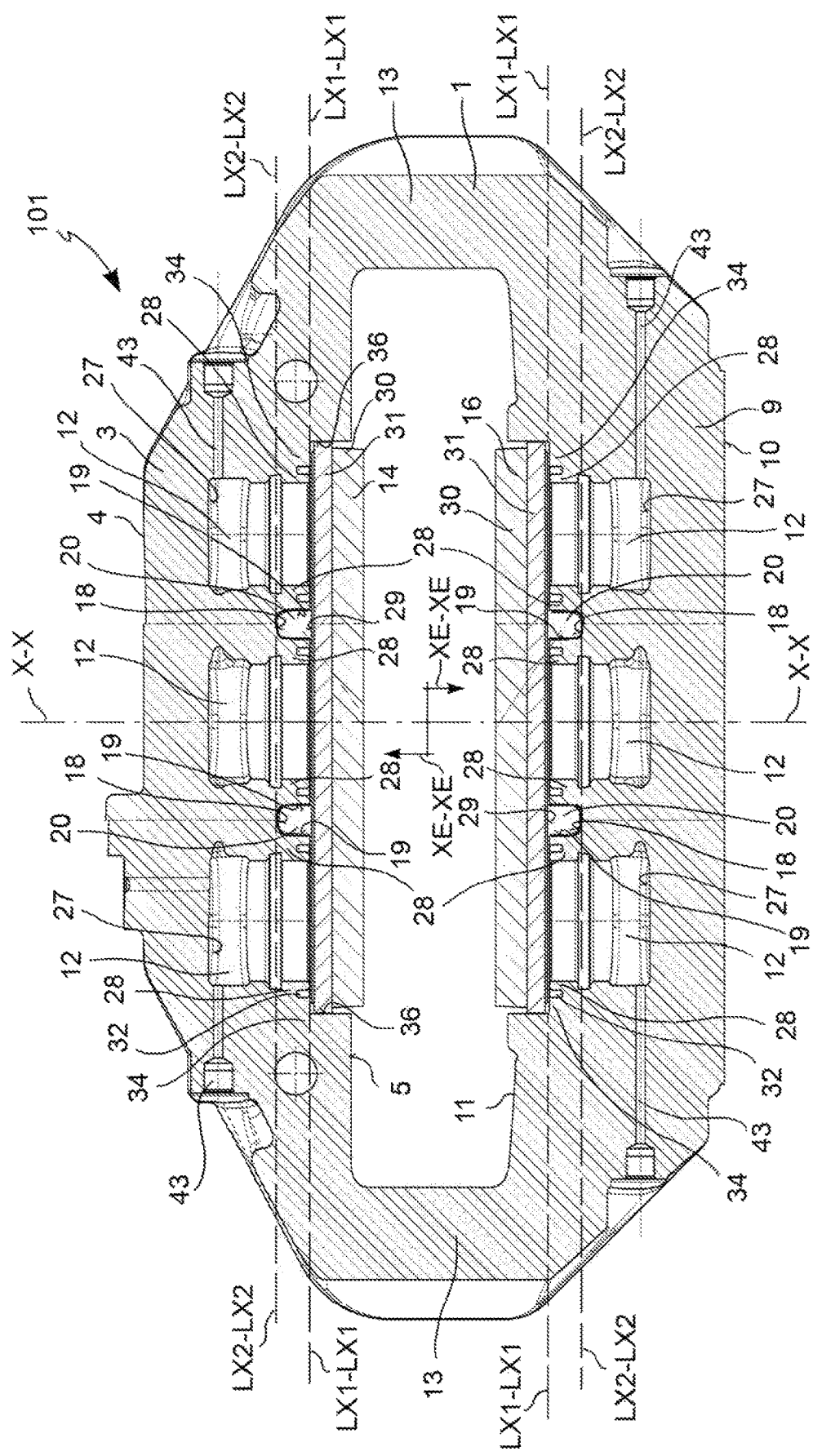
FIG. 6 is a section taken along an axial and circumferential cutting plane which illustrates a brake caliper.
Figure 7:
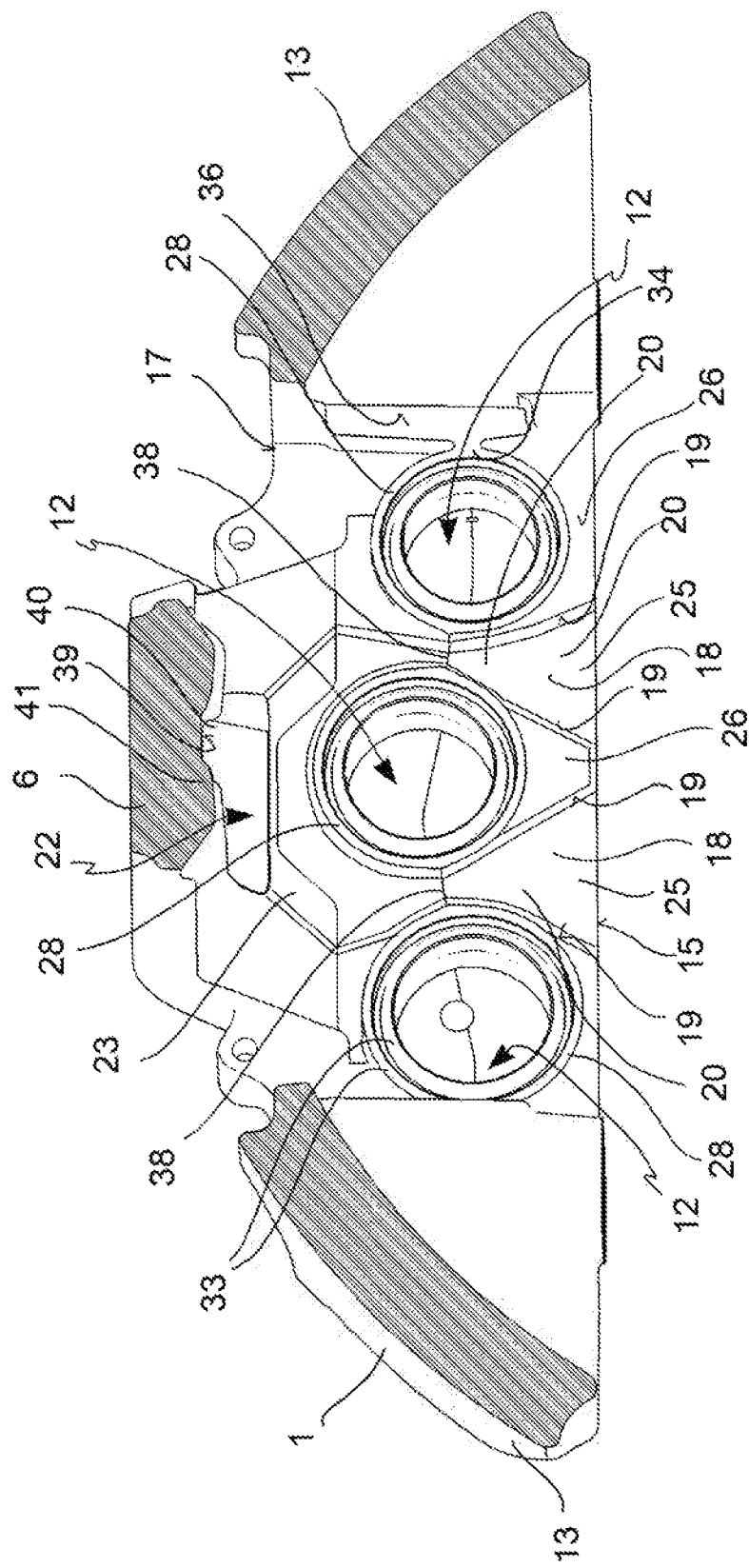
FIG. 7 is an axonometric view of a section taken along a radial and circumferential cutting plane of a caliper body, which illustrates the wheel side elongated element inner side.
Figure 8:
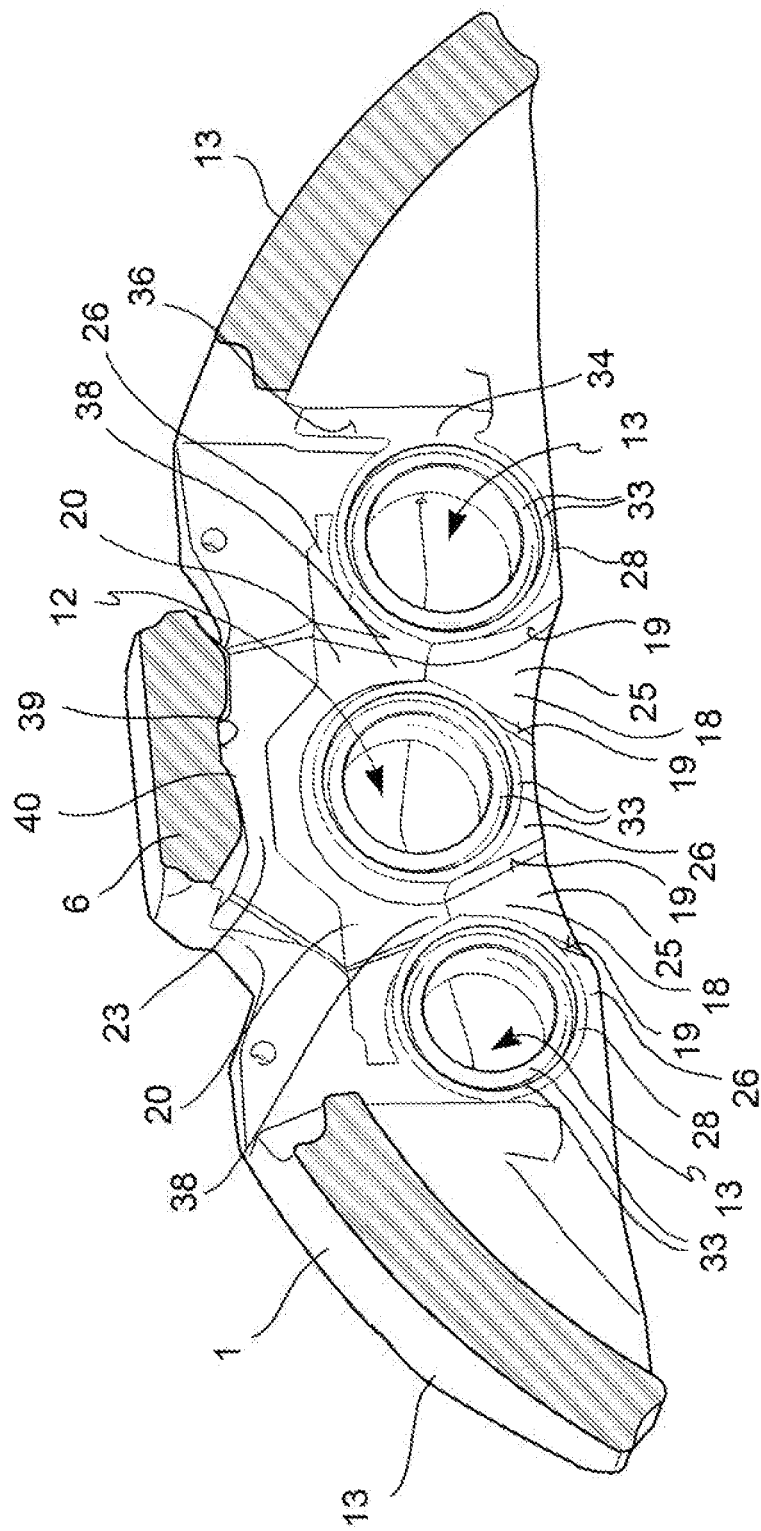
FIG. 8 is an axonometric view of a section taken along a radial and circumferential cutting plane of a caliper body, which illustrates the opposite wheel side elongated element inner side.
Figure 9:
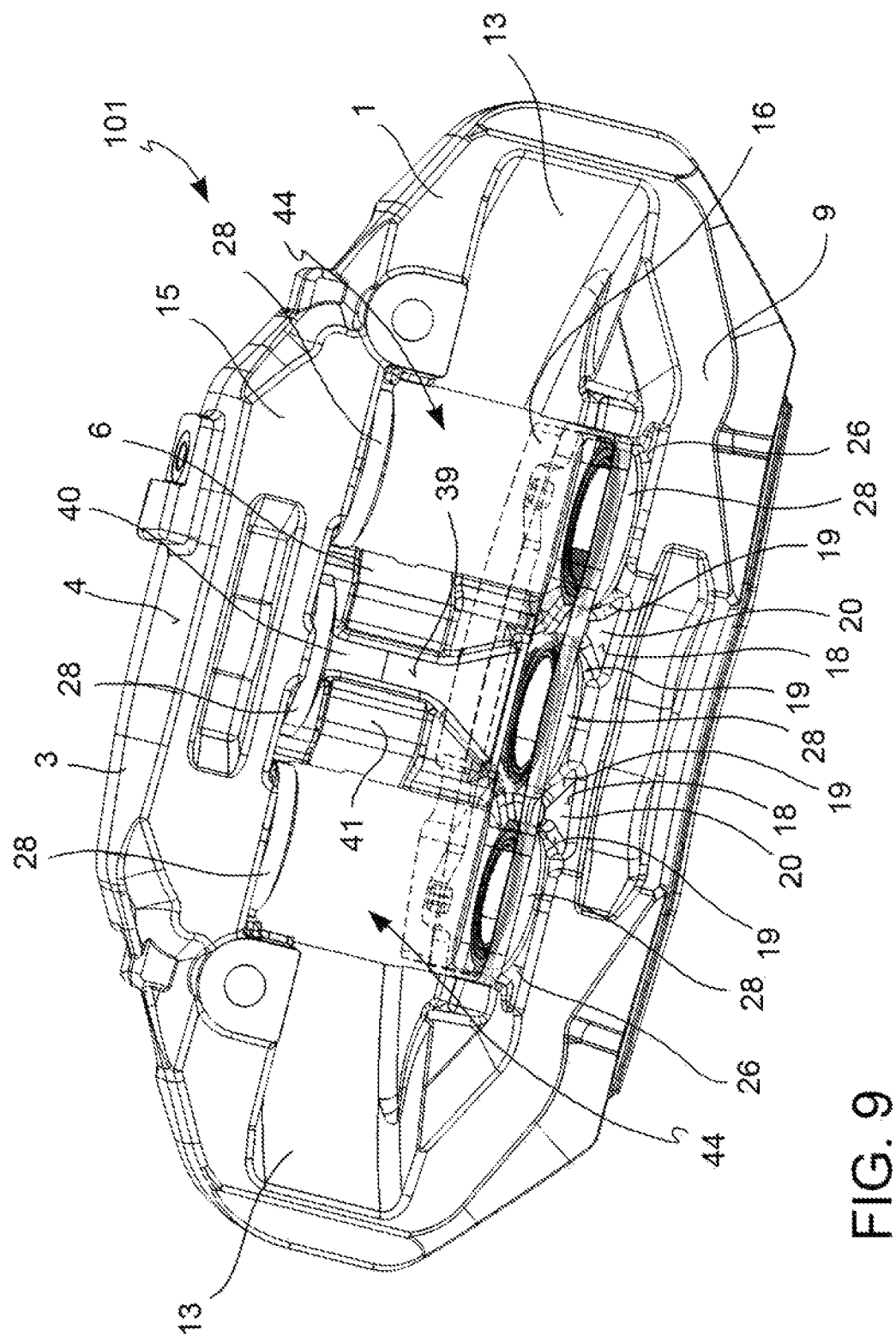
FIG. 9 shows a radially inner axonometric view of a caliper body, in which an associable pad is shown transparent and mounted on the inner side of the opposite wheel side elongated element.
Figure 10:
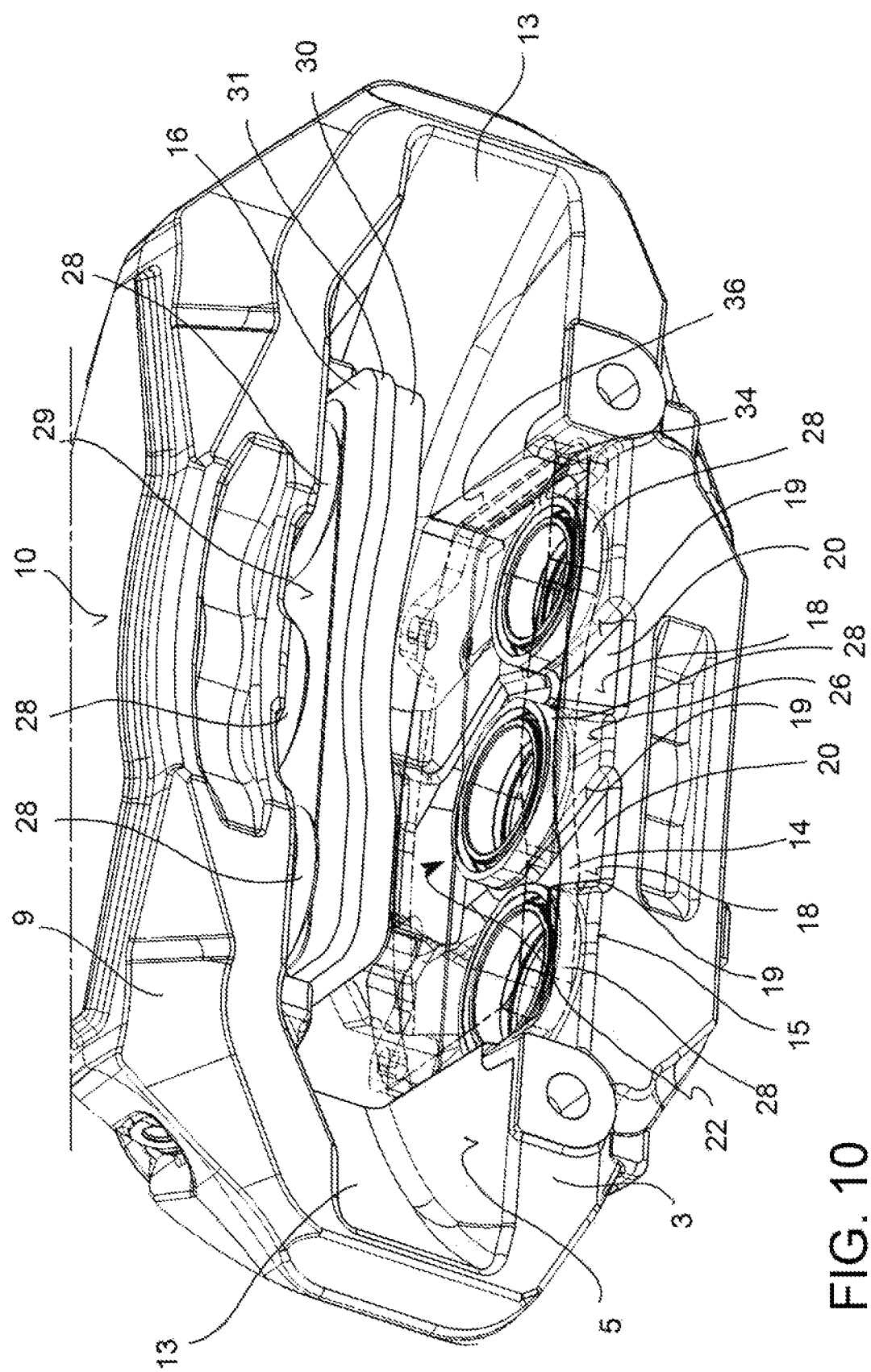
FIG. 10 shows a radially inner axonometric view of a brake caliper, in which a pad is shown transparent and mounted on the wheel side elongated element inner side.
Figure 11:
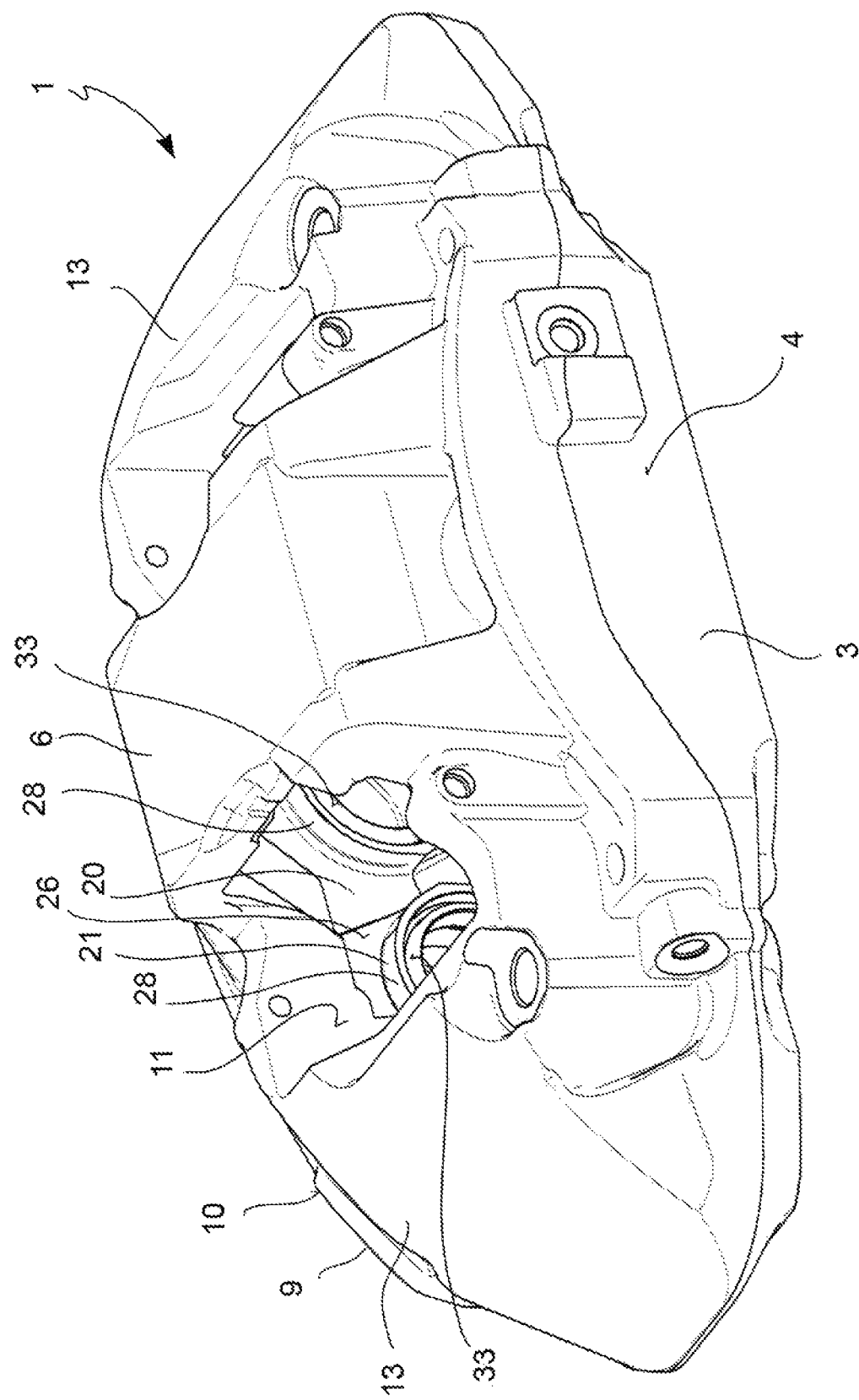
FIG. 11 shows a radially outer axonometric view of a brake caliper, according to an embodiment.
Figure 12:
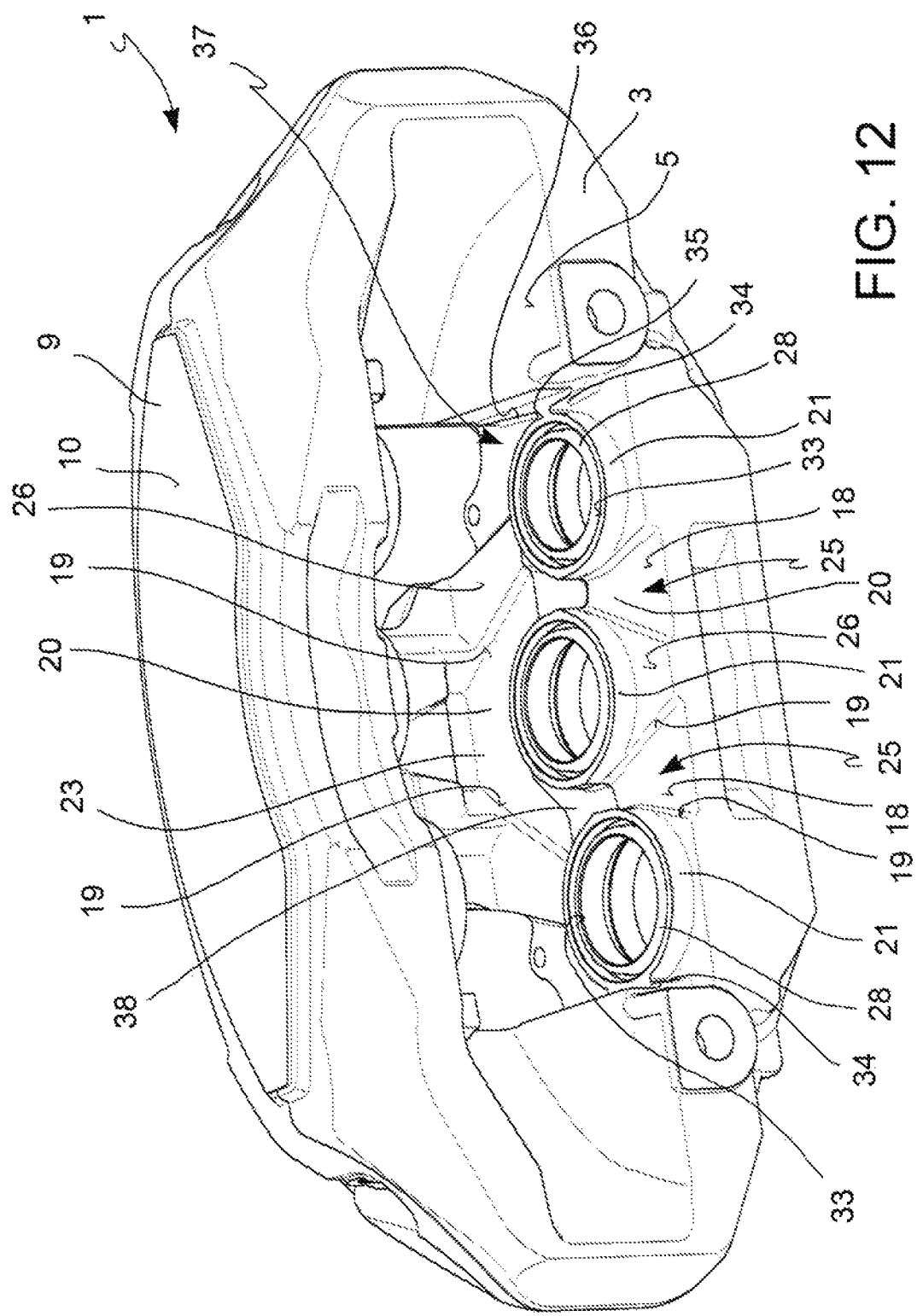
FIG. 12 shows a radially inner axonometric view of a brake caliper, according to an embodiment.
Figure 13:
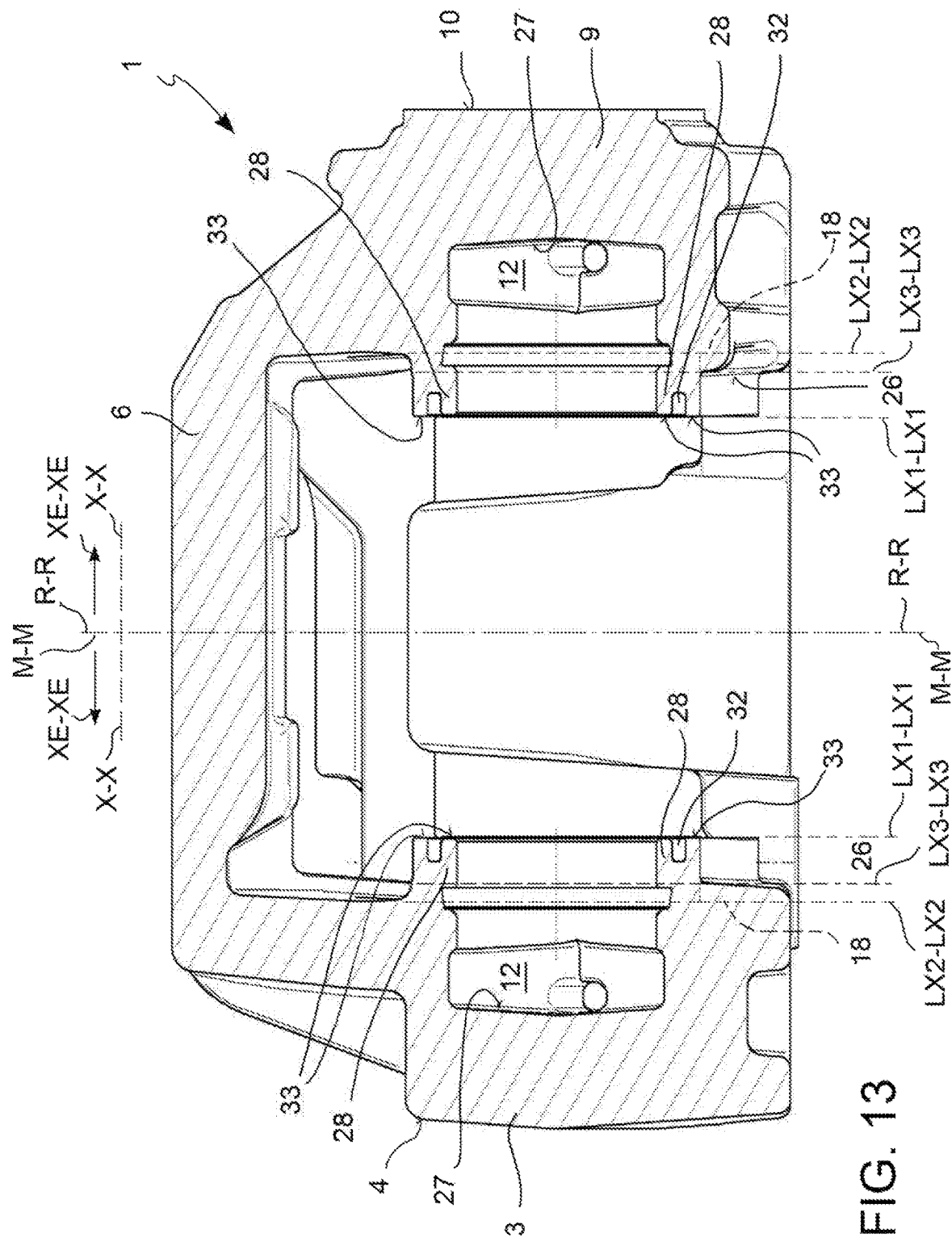
FIG. 13 is a diagrammatic section taken along a longitudinal plane of a brake caliper, according to an embodiment.

According to a general embodiment, a caliper body 1 for a brake caliper 101 for disc brake 100 is provided.

The caliper body 1 is adapted to be arranged straddling a brake disc 2. The brake disc 2 comprises a brake disc first braking surface 7 and an opposite brake disc second braking surface 8.

The disc brake 100 defines an axial direction X-X, either coinciding with or parallel to the rotation axis of the brake disc 2, a radial direction R-R, orthogonal to the axial direction X-X, and a circumferential direction C-C, orthogonal to both the axial direction X-X and the radial direction R-R.

The caliper body 1 comprises a wheel side first elongated element 9, comprising a first elongated element caliper outer side 10 and a first elongated element caliper inner side 11, or wheel side elongated element inner side 11, in which the first elongated element caliper outer side 10 is adapted to face a vehicle wheel and in which the first elongated element caliper inner side 11 is adapted to face the first brake disc braking surface 7, either directly or indirectly, by means of at least one first pad 14.

The caliper body 1 comprises an opposite wheel side second elongated element 3, comprising a second elongated element caliper outer side 4 and a second elongated element caliper inner side 5, or opposite wheel side elongated element inner side 5, wherein the second elongated element caliper inner side 5 is adapted to face, either directly or indirectly, by means of at least one second pad 16 opposite to the second brake disc braking surface 8.

A middle plane M-M is defined orthogonal to the axial direction X-X and interposed between the first elongated element caliper inner side 11 and the second elongated element caliper inner side 5. The middle plane M-M is a median working plane which can be defined in the caliper body 1. The middle plane M-M defines an axially outer sense XE-XE directed in axial direction X-X from the middle plane M-M. Consequently, an axially inner sense is defined as the sense opposite to the axially outer sense XE-XE. A radially outer sense RE-RE is further defined directed in radial direction R-R by the rotation axis of the brake disc 2. Consequently, a radially inner sense is defined as the sense opposite to the radially outer sense RE-RE. In a brake disc 100, the middle plane M-M as parallel to the brake disc first braking surface 7 and to the brake disc opposite second braking surface 8, the middle plane M-M may be interposed between the first brake disc braking surface 7 and the brake disc second braking surface 8.

The at least one first pad 14 and the at least one second pad 16 comprise a friction material 30 and a support plate 31 comprises a back 29 facing opposite to the friction material 30. According to an embodiment, the back 29 is made in one piece with the support plate 31. According to an embodiment, the back 29 is made in a separate piece and then assembled to the support plate 31.

At least either the wheel side first elongated element 9 or the opposite wheel side second elongated element 3 comprises at least one thrust means housing 12 adapted to receive thrust means, adapted to bias either the first pad 14 against the brake disc first braking surface 7 or the second opposite pad 16 against the second opposite brake disc braking surface 8. According to a preferred embodiment, the thrust means housing 12 is the cylinder of a cylindrical piston assembly.

The at least one thrust means housing 12 is substantially cup-shaped and comprises a housing bottom wall 27 and a housing lead-in portion 28, axially opposite to the housing bottom wall 27.

The at least one housing lead-in portion 28 comprises at least one housing edge surface 33, adapted to face a back 29 of a support plate 31 of a pad 14 or 16 which can be associated with the caliper body 1. Preferably, the housing edge surface 33 defines a housing mouth plane LX1-LX1 substantially parallel to the middle plane M-M.

The caliper body 1 further comprises at least one first caliper bridge 6, which connects the wheel side first elongated element 9 and the opposite wheel side second elongated element 3, so as to be adapted to straddle the brake disc 2.

Advantageously, at least either the first elongated element caliper inner side 11 or the second elongated element caliper inner side 5 comprises at least one groove bottom wall 18 and groove sides 19 which delimit at least one groove 20 or slot 20. The word "groove" means a channel which extends along a predetermined longitudinal path which, at least for a portion of its longitudinal path, not entirely surrounded by caliper body walls 1 and is adapted to face directly, by means of a least one longitudinal groove window, the back 29 of the support plate 31 of the at least one pad 14 or 16 which can be associated with the caliper body 1.

Providing the at least one groove 20 makes it possible to cool the caliper body 1, when in working conditions, by forming a thermal barrier between the caliper body 1 and the heat source, which is at least a braking surface of the disc 7 or 8 which is in contact with the friction material 30 of the pad 14 or 16 transfers the heat to the support plate 31.

Preferably, the groove bottom wall 18 is adapted to face the back 29 of the support plate 31 of a pad 14 or 16 which can be associated with the caliper body 1, by means of at least a longitudinal groove window. Preferably, the groove sides 19 comprise two opposite groove sides 19. According to an embodiment, the groove bottom wall 18 is made in one piece with the groove sides 19. According to an embodiment, the groove bottom wall 18 and the groove sides 19 are portions of a single curved surfaces, facing the groove 20.

The at least one groove bottom wall 18 is axially outer which respect to the housing edge surface 33. In other words, the at least one groove bottom wall 18 is axially outer which respect to the reference plane LX1-LX1. By providing the at least one groove bottom 18 arranged externally along the axial direction X-X with respect to the reference plane LX1-LX1, it is possible to lighten the caliper body 1, and at the same time to cool down the caliper body 1 when in working conditions.

The at least one groove 20 comprises at least one first groove mouth 23, or radially outer groove mouth 23, and at least one opposite groove mouth 25, or radially inner groove mouth 25, at the opposite end of the longitudinal path of the groove 20. "Longitudinal path" means the longitudinal development of the groove 20.

According to an embodiment, the caliper body 1 is associated with air conveying means, adapted to convey air to the at least one groove 20. For example, the air conveying means comprise at least one air conveying channel. For example, the air conveying means comprise a pipe made in one piece or separate piece with respect to the caliper body 1.

According to an embodiment, the first caliper bridge 6 at least partially delimits with an opening edge 24 thereof at least one bridge opening 22, or wheel opposite side bridge opening 22, in which the at least bridge opening 22 puts the second elongated element caliper inner side 5 into communication with the second elongated element caliper outer side 4. According to an embodiment, the first caliper bridge 6 at least partially delimits a cooling air conveying channel 40, or air conveying channel 40, which extends longitudinally to the first caliper bridge 6. Preferably, the cooling air conveying channel 40 is in fluid communication with the bridge opening 22. Preferably, the air conveying channel 40 prevalently extends in axial direction X-X between the wheel side elongated element inner side 5 and the opposite wheel side elongated element inner side 11.

Preferably, the first groove mouth 23, or groove radially outer mouth 23, or channel side mouth 23, of the at least one groove 20 fluidically connects the at least one groove 20 and the cooling air conveying channel 40. For example, in working conditions, for example in forward travel conditions of a vehicle comprising the caliper body 1, the opening 22 works as collection vent of the air which is forced, by means of the air conveying channel 40 and the at least one channel side mouth 23, to flow in the at least one groove 20 and to exit from the caliper body 1 through the opposite groove mouth 25. Preferably, the opposite groove mouth 25 leads outside the caliper body 1.

According to an embodiment, the at least one groove 20 is delimited by the groove bottom wall 18 and by opposite groove sides 19, thus avoiding the need to provide a covering wall made in one piece with the caliper body 1 along the longitudinal path of the groove 20. In other words, groove bottom wall 18 is entirely adapted to face the back 29 of the support plate 31 of a pad 14 or 16 which can be associated with the caliper body 1, by means of a single groove window which extends along the entire longitudinal path of the groove 20.

According to an embodiment, the first caliper bridge 6 comprises an inner bridge side 41, adapted to face either directly or indirectly a brake disc 2 which can be associated with the caliper body 1, wherein the inner bridge side 41 at least partially delimits the air conveying channel 40.

Preferably, the air conveying channel 40 is delimited by a channel bottom wall 39, either directly or indirectly facing a brake disc 2 which can be associated with the caliper body 1, and by channel sides. The channel extends along a prevalent path in axial direction X-X, wherein at least for a prevalent portion of its path in axial direction X-X, it is not entirely surrounded by walls of the caliper body 1 and faces either directly or indirectly the brake disc 2 which can be associated with the caliper body 1. Instead, according to a preferred embodiment, no opening is made between the first caliper bridge 6 and the wheel side first elongated element 9.

According to an embodiment, the caliper body 1 comprises at least one partition 42 which delimits at least one prevalent portion of the longitudinal path, e.g. in axial direction X-X, of the air conveying channel 40, so that the air conveying channel 40 is radially delimited for a prevalent portion thereof. In this manner, the channel bottom wall 39 faces the partition 42. The partition 42 separates the air conveying channel 40 from the brake disc 2 and/or of the pads 14 or 16, making it possible to thermally insulate the cooling current which flows in the conveying channel 40 from the heat of the brake disc 2, avoiding the heat of the disc braking surfaces 7, 8 as well as the pads 14, 16 to be transmitted to the cooling fluid current, thereby heating it. Preferably, the partition 42 is radially interrupted outside the channel mouth 23 of the at least one groove 20. Preferably, the partition 42 is radially interrupted outside the radially outer edge 17 of the caliper body 1. By providing the partition 42 it is possible to convey the cooling fluid current coming from the bridge opening 22 into the at least one groove 20 envisaged in the caliper body 1. According to an embodiment, the partition 42 is a blade spring, adapted to bias the pads 14, 16 elastically in axial direction X-X or circumferential direction C-C.

According to an embodiment, the caliper body 1 further comprises at least one caliper bridge 13 which connects the wheel side first elongated element 9 and the opposite wheel side second elongated element 3, so as to be adapted to be arranged straddling the brake disc 2, wherein the at least one second caliper bridge 13 and the at least one first caliper bridge 6 delimit at least one caliper body opening 44, adapted to promote the evacuation of heat accumulated in the brake disc 2. Preferably, the least one second caliper bridge 13 is free from air conveying channels. Preferably, the at least one second caliper bridge 13 is arranged circumferential externally with respect to the at least one first caliper bridge 6. According to an embodiment, the caliper body 1 comprises at least two second circumferentially outer caliper bridges 13 with respect to the at least one first caliper bridge 6.

According to an embodiment, the opposite wheel side second elongated element 3 comprises a radially inner edge 15 and a radially outer edge 17, which delimits the dimension in radial direction R-R of the opposite wheel side second elongated element 3. According to an embodiment, the at least one groove 20 connects at least one portion of the radially inner edge 15 to the radially outer edge 17, so as to allow a cooling fluid current flow between the bridge opening 22 and the radially inner edge 15 of the opposite wheel side second elongated element 3. According to an embodiment, the first elongated wheel side 9 comprises a radially inner edge 15 and a radially outer edge 15.

According to an embodiment, the at least one housing lead-in edge portion 28 comprises a body made in one piece with the caliper body 1.

According to a preferred embodiment, the body of the at least one housing lead-in edge portion 28 is associated with at least one connection rib 34, or connection staple 34, which connects the body of the at least one housing lead-in edge portion 28 to the caliper body 1.

According to an embodiment, the body of the at least one housing lead-in edge portion 28 protrudes axially projecting from at least either the first elongated element caliper inner side 11 or the second elongated element caliper inner side 5, thereby forming a cooling surface 21 facing the groove 20, except for the connection rib 34.

According to an embodiment, the connection rib 34 comprises a staple surface 35, adapted to face the back 29 of the support plate 31 of a pad 14 or 16 which can be associated with the caliper body 1.

According to an embodiment, the staple surface 35 is coplanar with the housing edge surface 33. In this manner, the staple surface 35 is substantially coplanar with the reference plane LX1-LX1. According to an embodiment, the housing edge surface 33 seamlessly continues in the staple surface 35.

According to an embodiment, the body of the at least one housing lead-in edge portion 28 comprises at least one cooling surface 21 facing the groove 20, wherein the at least one cooling surface 21 is free from the material of the caliper body 1. Preferably, the cooling surface 21 faces opposite to the thrust means housing 12. In this manner, the cooling surface 21 of the body of the housing lead-in edge portion 28 can be exposed to the cooling air current flow, whereby improving the cooling of the at least one thrust means housing 12, and consequently of thrust means which can be associated with the at least one thrust means housing.

According to an embodiment, the at least one groove 20 extends to surround at least partially the portion of housing lead-in edge 28. In other words, the at least one groove bottom wall 18 at least partially surrounds the body of the housing lead-in edge portion 28. In this manner, a cooling fluid current can flow about the body of the housing lead-in edge portion 28, whereby cooling it.

According to an embodiment, the body of the housing lead-in edge portion 28 is substantially annular about the thrust means housing 12. According to an embodiment, the at least one cooling surface 21 is substantially annular to surround the body of the housing lead-in edge portion 28 and is interrupted only by at least one connection rib 34.

According to an embodiment, the at least one cooling surface 21 is substantially cylindrical and interrupted by the at least one connection rib 34. According to an embodiment, the at least one cooling surface 21 is substantially truncated-cone-shaped and interrupted by the at least one connection rib 34.

According to a preferred embodiment, the groove bottom wall 18 is connected to the cooling surface 21 of the housing lead-in edge portion 28. In this manner, the extraction of the caliper body 1 from the die is facilitated during the manufacturing of the caliper body 1, e.g. by means of foundry techniques, such as sand casting or shell casting.

According to an embodiment, the at least one groove 20 comprises at least two groove branches which join in a radially outer portion with respect to the at least one housing lead-in edge 28.

According to an embodiment, the at least one housing lead-in edge portion 28 comprises at least one portion of at least one groove side 19. Preferably, the cooling surface 21 of the housing lead-in edge portion 28 at least in one portion thereof coincides with a groove side 19.

Preferably, the at least one housing lead-in edge portion 28 is substantially annular which surrounds the opening of the thrust means housing 12. Preferably, the at least one housing edge surface 33 is substantially circular crown shaped and surrounds the opening of the thrust means housing 12.

According to an embodiment, the housing lead-in edge portion 28 comprises at least one seal housing slot 32, adapted to receive a portion of a seal, e.g. a portion of a dust boot for thrust means which can be associated with the thrust means housing 12. In this manner, the housing edge surface 33 is interrupted by the at least one seal housing slot 32. Preferably, the seal housing slot 32 is substantially ring-shaped. According to an embodiment, the at least one housing lead-in edge portion 28 comprises at least two housing edge surfaces 33 which are substantially circular-crown-shaped and mutually concentric, separated by at least one seal housing slot 32.

According to an embodiment, the at least one groove 20 has a prevalent extension in radial direction R-R. In other words, the at least one groove bottom wall 18 prevalently extends in radial direction R-R.

According to an embodiment, the at least one groove bottom wall 18 defines a groove bottom plane LX2-LX2, substantially parallel to the middle plane M-M and axially outer with respect to the reference plane LX1-LX1.

According to an embodiment, at least either the first elongated element caliper inner side 11 and the second elongated element caliper inner side 5 comprise at least one inner side surface 26, adapted to face directly the back 29 of the support plate 31 of a pad 14 or 16 which can be associated with the caliper body 1, wherein the at least one inner side surface 26 is axially outside the housing edge surface 33 and axially inside the groove bottom wall 18. In this manner, a multilevel caliper inner side surface axially external to the housing edge surface 33 can be made, adapted to convey the cooling fluid current about the cooling surface of the body of the housing lead-in edge portion 28.

According to an embodiment, the at least one inner side surface 26 defines an inner side plane LX3-LX3, substantially parallel to the middle plane M-M.

According to an embodiment, the inner side plane LX3-LX3 is axially outside the reference plane LX1-LX1 and is axially inside the groove bottom plane LX2-LX2. In other words, the inner side plane LX3-LX3 is axially interposed between the reference plane LX1-LX1 and the groove bottom plane LX2-LX2.

By providing the at least one inner side surface 26, at least either the first elongated element caliper inner side 11 or the second elongated element caliper inner side 5 comprises surfaces arranged on at least three levels, whereby promoting the circulation of a fluid cooling current between the caliper body 1 and the back 29 of the support plate 31 of a pad 14 or 16 and at the same time providing a satisfactory structural resistance to the stresses arising during the braking action to the caliper body 1.

By providing the aforesaid inner side surface 26 and groove bottom wall 18 axially external with respect to the housing edge surface 33, substantially makes a retraction, in other words makes an axial distancing of the pads 14, 16, of the caliper body portion which forms the first elongated element caliper inner side 11 and/or the second elongated element caliper inner side 5, to clear enough space for the circulation of a fluid cooling current. According to an embodiment, the at least one portion of housing lead-in edge 28 protrudes axially projecting either from the inner side surface 26 or from the groove surface 18, except for the connection staple 34.

According to an embodiment, at least either the inner side surface 26 and the groove bottom surface 18 extends to surround the housing lead-in edge portion 28, except for the connection staple 34. In other words, the inner side surface 26 and the groove bottom surface 20 surround the housing lead-in edge portion 28, except for the connection staple 34. In this manner, a cooling fluid current can flow about the housing lead-in edge portion 28, thereby cooling it.

According to an embodiment, the at least one groove 20 interrupts the inner side surface 26.

According to a preferred embodiment, the inner side surface 26 is joined to the groove bottom wall 18 and with the cooling surface 21 of the housing lead-in edge portion 28.

According to an embodiment, the at least one radially inner groove mouth 25 which leads into the radially inner edge 15 increases by extension in circumferential direction C-C approaching the radially inner edge 15. In other words, the opposite groove sides 19 of the radially inner mouth 25 are mutually distanced in circumferential direction C-C, whereby increasing the cross section of the groove 20. According to an embodiment, the at least one radially inner groove mouth 25 increases by extension in axial direction X-X, approaching the radially inner edge 15. In other words, the groove bottom wall 18 moves away from the facing back 29 of a support plate 31 of a pad 14 or 16 which can be associated with the caliper body 1, whereby increasing the cross section of the groove 20.

According to an embodiment, at least either the wheel side first elongated element 9 or the opposite wheel side second elongated element 11 comprise at least two circumferentially facing housing lead-in mouth portions 28, which each delimit a thrust means housing 12, wherein the at least one groove 20 extends between the at least two housing lead-in edge portions 28 forming a groove bottleneck 38 of minimum circumferential extension. In other words, the walls of two circumferentially facing housing lead-in edge portions 28 delimit a groove bottleneck 38, having small circumferential extension. In other words, the groove bottom wall 18 interposed between two circumferentially facing housing lead-in edge portions 28 has minimum circumferential extension. By virtue of the groove bottleneck 38 it is possible to accelerate the cooling fluid current near the walls of the circumferentially facing housing lead-in edge portions 28. According to an embodiment, the at least one groove 20 is substantially Venturi-tube-shaped.

According to an embodiment, at least either the wheel side first elongated element 9 or the opposite wheel side second elongated element 3 comprises at least three housing lead-in edge portions 28 arranged circumferentially side-by-side, which each delimit a thrust means housing 12, wherein at least one groove 20 is interposed between two housing lead-in edge portions 28 arranged side-by-side and successive, and wherein an inner side surface 26 forms an island which at least partially surrounds the housing lead-in edge portion 28 interposed between two housing lead-in edge portions which are arranged circumferentially side-by-side 28.

According to an embodiment, at least either the first elongated element caliper inner side 11 or the second elongated element caliper inner side 5 comprises circumferentially facing opposite shoulder walls 36, adapted to form opposite circumferential abutment references for the support plate 31 of the first pad 14 or the second pad 16, respectively, and which at least partially delimit a housing pocket 37, adapted to receive at least one portion of the first pad 14 or of the second pad 16, respectively. According to an embodiment, the at least one connection staple 34 connects the housing lead-in edge portion 28 to one of the shoulder walls 36.

According to an embodiment, the caliper body 1 further comprises a brake fluid feeding pipe 43, in fluid communication with at least one thrust means housing 12.

According to an embodiment at brake caliper 101 comprises a caliper body 1 according to any of the embodiments described above, and at least one pad 14, 16. Preferably, the at least one groove bottom wall 18 of the caliper body 1 faces the back 29 of the support plate 31 of the at least one pad 14 or 16 of the brake caliper 101. According to an embodiment, the brake caliper 101 comprises thrust means accommodated in respective thrust means housings 12. For example, the thrust means comprise at least one piston.

According to a general embodiment, a disc brake 100 comprises at least one brake caliper 101 according to any one of the embodiments described above, and at least one brake disc 2 having opposite braking surfaces 7, 8.

By virtue of the features described above, either mutually separately or jointly, where applicable, in particular embodiments, a caliper body 1, a brake caliper 101 and a disc brake 100 can be obtained, which at the same time satisfy the aforesaid mutually contrasting needs and achieve the aforesaid desired advantages, and in particular:

- allow the efficient cooling of the caliper body 1;
- allow the formation of a thermal barrier between the caliper body 1 and the heat source also during the braking action;
- keep the brake fluid temperature sufficiently low to prevent it from boiling, guaranteeing prompt braking;
- make it possible to obtain a caliper body 1 which is resistant to the stress arising from the braking action.

A person skilled in art may make many changes, adaptations and replacements to the embodiments described above or may replace elements with others which are functionally equivalent in order to satisfy contingent needs without however departing from the scope of protection of the appended claims.

LIST OF REFERENCES 45. caliper body
46. brake disc
47. second elongated element opposite wheel side
48. second elongated element caliper outer side
49. second elongated element caliper inner side, or opposite wheel side elongated element inner side
50. central caliper bridge
51. disc braking surface
52. opposite disc braking surface
53. first elongated element wheel side
54. first elongated element caliper outer side
55. first elongated element caliper inner side, or wheel side elongated element inner side
56. thrust means housing
57. side caliper bridge
58. first pad
59. radially inner edge
60. second pad
61. radially outer edge
62. groove bottom wall
63. groove side
64. groove, or slot 65. cooling surface of the housing lead-in edge portion
66. bridge opening
67. mouth side channel, or first groove mouth, or radially outer groove mouth
68. central caliper bridge opening edge
69. opposite groove mouth, or second groove mouth, or radially inner groove mouth
70. inner side surface
71. housing bottom wall of the thrust means housing
72. housing lead-in edge portion of the thrust means housing
73. support plate back
74. friction material
75. support plate
76. housing seal groove
77. housing bottom surface
78. connection staple, or connection rib
79. staple surface
80. shoulder wall
81. housing pocket
82. groove bottleneck
83. channel bottom wall
84. air conveying channel
85. bridge inner side of central caliper bridge
86. partition
87. brake fluid feeding pipe
88. brake caliper opening
X-X. axial direction
XE-XE. axially outer sense
R-R. radial direction
RE-RE. radially outer sense
C-C. circumferential or tangential direction
M-M. middle plane
LX1-LX1. reference plane
LX2-LX2. groove bottom plane
LX3-LX3. inner side plane

The invention claimed is:

1. A caliper body for a brake caliper for a disc brake, adapted to be arranged straddling a brake disc, said brake disc comprising a first brake disc braking surface and an opposite second brake disc braking surface, said disc brake defining an axial direction, either coinciding with or parallel to the brake disc rotation axis, a radial direction, orthogonal to the axial direction, and a circumferential direction, orthogonal both to the axial direction and to the radial direction;

said brake caliper comprising:
a wheel side first elongated element, comprising a first elongated element caliper outer side and a first elongated element caliper inner side, wherein said first elongated element caliper outer side is adapted to face a vehicle wheel and wherein said first elongated element caliper inner side is adapted to face said first brake disc braking surface, either directly or indirectly, via at least one first pad;
an opposite wheel side second elongated element, comprising a second elongated element caliper outer side and a second elongated element caliper inner side, wherein said second elongated element caliper inner side is adapted to face said second brake disc braking surface, either directly or indirectly, via a second opposite pad;
at least one first caliper bridge, which connects said wheel side first elongated element and said opposite wheel side second elongated element, so as to be adapted to straddle said brake disc;
wherein a middle plane orthogonal to the axial direction and is interposed between said first elongated element caliper inner side and said second elongated element caliper inner side, said middle plane defining an axial outer sense directed in axial direction from said middle plane; and wherein a radially outer sense is defined directed in radial direction from the rotation axis of the brake disc;
and wherein:
at least either said wheel side first elongated element or said opposite wheel side second elongated element comprises at least one thrust housing adapted to receive thrust, adapted to actuate the at least one first pad against said brake disc first braking surface or the second opposite pad against said second opposite brake disc braking surface;
said at least one thrust housing is substantially cup-shaped and comprises a housing bottom wall and a housing lead-in portion, axially opposite to said housing bottom wall,
said housing lead-in portion comprises at least one housing edge surface, adapted to face a back of a support plate of a pad which can be associated with the caliper body;
and wherein:
at least either said first elongated element caliper inner side or said second elongated element caliper inner side comprises at least one groove bottom wall and groove sides which delimit at least one groove, wherein said at least one groove bottom wall is axially outer with respect to said at least one housing edge surface;
said at least one groove comprises at least one first groove mouth, or radially outer groove mouth, and at least one opposite second groove mouth, or radially inner groove mouth, at the opposite end of the longitudinal path of said at least one groove.

2. The caliper body according to claim 1, wherein said at least one groove bottom wall is adapted to face the back of the support plate of a pad which can be associated with the caliper body; and/or wherein
said at least one groove is a channel which extends along said longitudinal path which, at least for a portion of said longitudinal path, not entirely surrounded by caliper body walls and is adapted to face, via at least one longitudinal groove window, directly the back of the support plate of said at least one pad; and/or wherein
said caliper body is associated with an air conveying device, adapted to convey air to said at least one groove; and/or wherein
said at least one first caliper bridge at least partially delimits a bridge opening that puts the second elongated element inner side in fluidic communication with the second elongated element outer side; and/or wherein
said at least one first caliper bridge at least partially delimiting a cooling air conveying channel which extends longitudinally to said at least one first caliper bridge; and/or wherein
said cooling air conveying channel being in fluidic communication with said bridge opening; and/or wherein
a first bridge mouth fluidically connects said at least one groove and said cooling air conveying channel; and/or wherein
said second opposite groove mouth leads outside the caliper body; and/or wherein
said at least one groove bottom wall is made in one piece with said groove sides.

3. The caliper body according to claim 1, wherein said at least one groove is delimited by said at least one groove bottom wall and by opposite groove sides, thus avoiding the need to provide a covering wall made in one piece with the caliper body along the longitudinal path of the at least one groove; and/or wherein said at least one groove bottom wall is entirely adapted to face the back of the support plate of a pad which can be associated with the caliper body, via a single groove window which extends along the entire longitudinal path of the at least one groove.

4. The caliper body according to claim 1, wherein said at least one portion of said at least one housing edge surface comprises a body made in one piece with said caliper body and/or wherein the body of said at least one portion of said at least one housing edge surface housing lead-in edge is associated with at least one connection rib which connects the body of said at least one portion of said at least one housing edge surface to the caliper body; and/or wherein the body of said at least one portion of said at least one housing edge surface protrudes axially projecting from at least either said first elongated element caliper inner side or said second elongated element caliper inner side forming at least one cooling surface facing said at least one groove, except for said at least one connection rib; and/or wherein said at least one cooling surface is free from the material of the caliper body; and/or wherein said at least one cooling surface is substantially annular to surround the body of said portion of said at least one housing edge surface and is interrupted only by said at least one connection rib; and/or wherein said at least one connection rib comprising a staple surface, adapted to face a back of the support plate of a pad which can be associated with the caliper body; and/or wherein said staple surface is co-planar with the at least one housing edge surface; and/or wherein said at least one housing edge surface seamlessly continues in said staple surface.

5. The caliper body according to claim 1, wherein said at least one housing edge surface defines a housing mouth plane substantially parallel to said middle plane; and/or wherein said at least one groove bottom wall is axially outer which respect to a reference plane; and/or wherein said at least one groove bottom wall defines a groove bottom plane, substantially parallel to said middle plane and axially outer with respect to the reference plane.

6. The caliper body according to claim 1, wherein at least either said first elongated element caliper inner side and said second elongated element caliper inner side comprise at least one inner side surface, adapted to face directly the back of the support plate of a pad which can be associated with the caliper body, wherein said at least one inner side surface is axially outside said at least one housing edge surface and axially inside said at least one groove bottom wall; and/or wherein said at least one portion of said at least one housing edge surface protrudes axially projecting either from said inner side surface or from said groove surface; and/or wherein said at least one inner side surface defining an inner side plane, substantially parallel to said middle plane; and/or wherein said inner side plane is axially outside a reference plane and is axially inside the groove bottom plane; and/or wherein said inner side plane is axially interposed between the reference plane and the groove bottom plane.

7. The caliper body according to claim 1, wherein said at least one groove extends to surround at least partially said portion of said at least one housing edge surface; and/or wherein said at least one groove comprises at least two groove branches which join in a radially outer portion with respect to the at least one housing edge surface; and/or wherein at least either said wheel side first elongated element or said opposite wheel side second elongated element comprises at least three portions of said at least one housing edge surface arranged circumferentially side-by-side which each delimit at least one thrust housing, wherein at least one groove is interposed between two portions of said at least one housing edge surface arranged side-by-side and successive, and wherein an inner side surface forms an island which at least partially surrounds the portion of said at least one housing edge surface interposed between two portions of said at least one housing edge surface which are arranged circumferentially side-by-side; and/or wherein at least either said first elongated element caliper inner side or said second elongated element caliper inner side comprises circumferentially facing opposite shoulder walls, adapted to form opposite circumferential abutment references for the support plate of the at least one first pad or the second opposite pad, respectively, and which at least partially delimit a housing pocket, adapted to receive at least one portion of said at least one first pad or of said second opposite pad, respectively; and/or wherein at least one connection jumper connects said portion of said at least one housing edge surface to one of said shoulder walls.

8. The caliper body according to claim 2, comprising at least one partition which delimits at least one prevalent portion of the longitudinal path of said cooling air conveying channel, so that a prevalent portion of said cooling air conveying channel is radially delimited by said partition, so that said at least one groove bottom wall faces said at least one partition and/or wherein said at least one partition separates said cooling air conveying channel from the brake disc which can be associated with the brake body and/or the pads which can be associated with the caliper body; and/or wherein said at least one partition is radially interrupted outside a channel mouth of said at least one groove.

9. The brake caliper comprises a caliper body according to claim 1, said at least one first pad, said second opposite pad and thrust devices housed in respective thrust housings of said at least one thrust housing.

10. The disc brake comprising at least one brake caliper according to claim 9, and said brake disc.

* * * * *